(12) United States Patent
Tong et al.

(10) Patent No.: US 12,469,657 B2
(45) Date of Patent: Nov. 11, 2025

(54) SWITCH HANDLE ASSEMBLY AND CUTTER CONTROL SYSTEM CONTAINING SAME

(71) Applicant: NINGBO LINGYUE INTELLIGENT EQUIPMENT CO., LTD, Zhejiang (CN)

(72) Inventors: Baijun Tong, Ningbo (CN); Shengqiu Zhu, Ningbo (CN); Chaojie Tao, Ningbo (CN); Shulin Peng, Ningbo (CN); Kaijie Xia, Ningbo (CN); Xiaobo Ye, Ningbo (CN)

(73) Assignee: NINGBO LINGYUE INTELLIGENT EQUIPMENT CO., LTD, Ningbo (CN)

( * ) Notice: Subject to any disclaimer, the term of this patent is extended or adjusted under 35 U.S.C. 154(b) by 497 days.

(21) Appl. No.: 17/975,578

(22) Filed: Oct. 27, 2022

(65) Prior Publication Data

US 2024/0055201 A1    Feb. 15, 2024

(30) Foreign Application Priority Data

Aug. 12, 2022  (CN) .......................... 202210967970.3
Aug. 12, 2022  (CN) .......................... 202222131473.8

(51) Int. Cl.
*H01H 19/14*    (2006.01)
(52) U.S. Cl.
CPC .................................. *H01H 19/14* (2013.01)
(58) Field of Classification Search
CPC .......... H01H 19/14; H01H 21/22; H01H 9/06; A01D 69/08; A01D 34/824
See application file for complete search history.

(56) References Cited

U.S. PATENT DOCUMENTS

| | | | | |
|---|---|---|---|---|
| 3,855,763 A | * | 12/1974 | Seifert | .................... A01D 34/63 56/DIG. 18 |
| 2023/0154702 A1 | * | 5/2023 | Zhang | ...................... H01H 3/38 200/336 |

\* cited by examiner

*Primary Examiner* — Ahmed M Saeed
(74) *Attorney, Agent, or Firm* — LANWAY IPR SERVICES; Chun-Ming Shih

(57) ABSTRACT

The present disclosure provides a switch handle component and a cutter control system containing the same, relates to the technical field of lawn mowers, and solves the technical problems of cumbersome and inconvenient ON-OFF operation of a clutch lever. The switch handle component comprises a manipulating handle, a locking plate, a fixed seat and a first tension spring, wherein the fixed seat is fixed to a frame; the manipulating handle is fixedly connected to the lower part of the locking plate; the locking plate is rotatably connected to the fixed seat; one end of the first tension spring is fixed to the frame and is provided near a rotating shaft of the locking plate, and the other end thereof is fixed to the middle of the locking plate; when the manipulating handle rotates to different positions, the first tension spring applies tension in different directions to the locking plate, respectively, so as to realize the automatic locking of the manipulating handle after switching among the OFF position, the dead point position and the ON position. The switch handle component of the present disclosure can automatically keep a certain force value after being moved to the proper position when switching between the ON state and the OFF state, so that the position can be automatically locked, and the operation is convenient and simple.

8 Claims, 4 Drawing Sheets

SWITCH HANDLE ASSEMBLY AND CUTTER CONTROL SYSTEM CONTAINING SAME

TECHNICAL FIELD

The present disclosure relates to the technical field of lawn mowers, in particular to a switch handle component and a cutter control system containing the same.

BACKGROUND

With the improvement of quality of life of people and the growing awareness of greening, more and more lawns appear in cities, and lawn mowers for mowing lawns are widely used. Lawn mowers are generally divided into hand-propelled, self-propelled and riding lawn mowers. At present, a riding lawn mower mainly consists of a frame, a mowing tray, a seat, an engine, a circuit control part, a transmission part and a clutch part. The engine drives the cutter in the mowing tray to rotate through the transmission system, and the clutch part is used to control the start and stop of the cutter.

The applicant finds that the prior art has at least the following technical problems.

There are two setting structures for the ON-OFF switch of the existing cutter. One setting structure is that the clutch handle is provided under the steering wheel. The setting structure will affect the packaging height of the whole machine in the actual production process, and the packing volume ratio will be poor. The second setting structure is that the clutch handle is provided beside the seat of a lawn mower, and then the position of the clutch lever is locked by a locking slot. When the clutch needs to be turned on or off, it is necessary to push the clutch lever out of the locking slot first, and then the clutch lever is pushed, so that the clutch lever swings to the ON position or the OFF position, and then the clutch lever is pushed into the locking slot to lock the position. Therefore, a plurality of actions are required for turning on or off the clutch lever, which is inconvenient to operate. Moreover, the locking slot is required for locking the clutch lever, which has a complex structure and many parts. Further, the locking slot cannot be used for locking after use for a long time.

SUMMARY

The object of the present disclosure is to provide a switch handle component and a cutter control system containing the same, so as to solve the technical problems of cumbersome and inconvenient ON-OFF operation of a clutch lever in the prior art.

In order to achieve the above object, the present disclosure provides the following technical scheme.

The present disclosure provides a switch handle component, comprising a manipulating handle, a locking plate, a fixed seat and a first tension spring, wherein:
the fixed seat is fixed to a frame;
the manipulating handle is fixedly connected to the lower part of the locking plate;
the locking plate is rotatably connected to the fixed seat;
one end of the first tension spring is fixed to the frame and is provided near a rotating shaft of the locking plate, and the other end thereof is fixed to the middle of the locking plate;
when the manipulating handle rotates to different positions, the first tension spring applies tension in different directions to the locking plate, respectively, so as to realize the automatic locking of the manipulating handle after switching among the OFF position, the dead point position and the ON position.

As a further improvement of the present disclosure, the manipulating handle is provided on the right side of a lawn mower seat.

As a further improvement of the present disclosure, the switch handle component further comprises a touching switch provided on the frame and a limiting block mechanism provided on the locking plate, wherein the limiting block mechanism is in contact with the touching switch when the manipulating handle rotates to the OFF position.

As a further improvement of the present disclosure, the locking plate has an elongated plate structure, the plate surface of the locking plate is Z-shaped, the limiting block mechanism is provided at one side of the tail end of the locking plate; and the first tension spring is connected to the side of the limiting block mechanism.

As a further improvement of the present disclosure, the manipulating handle comprises a clutch lever with a multi-section bending structure and a grip handle provided at the tail end of the clutch lever.

The present disclosure provides a cutter control system, comprising a belt tensioning component, a cable assembly and the switch handle component according to any of claims 1-5, wherein one end of the cable assembly is connected with the switch handle component, and the other end thereof is connected with the belt tensioning component, so that the belt tensioning component switches between the tensioning state and the releasing state when the manipulating handle rotates to different positions, and the cutter on the mowing tray rotates or stops.

As a further improvement of the present disclosure, the cable assembly comprises a pull rod and a second tension spring, the pull rod is rotatably connected with the tail end of the locking plate through a cylindrical pin; one end of the second tension spring is connected with the pull rod, and the other end thereof is connected with the belt tensioning component.

As a further improvement of the present disclosure, the beginning end of the pull rod is provided with a flexible rope, the beginning end of the flexible rope is provided with a pull ring, and the pull ring is sleeved outside the cylindrical pin.

As a further improvement of the present disclosure, the belt tensioning component comprises a drive belt, a first tool holder component, a second tool holder component, a guide wheel, a tensioning wheel, a rocker arm, a connecting rod, a first brake pad and a second brake pad, one end of the drive belt is in transmission connection with the power source of the lawn mower, and the other end thereof is wound around the tensioning wheel, the first tool holder component, the guide wheel and the second brake pad in sequence; the rocker arm is rotatably provided on the mowing tray, the tensioning wheel is rotatably mounted on the rocker arm, the first brake pad is mounted on the rocker arm, the second brake pad is mounted on the tail end of the connecting rod, and the beginning end of the connecting rod is mounted on the rocker arm; the second tension spring is connected to the rocker arm and is capable of pulling the rocker arm to rotate; when the rocker arm is in the original position, the first brake pad and the second brake pad are in contact with the pulleys on the first tool holder component and the second tool holder component, respectively, so as to realize braking; and when the rocker arm is in the original position, the tensioning wheel is lightly attached to or separated from the drive belt, and the drive belt is in the releasing state.

As a further improvement of the present disclosure, the first brake pad and the second brake pad are located on both sides of the rocker arm, respectively, and when the rocker arm is pulled to rotate, the first brake pad and the second brake pad follow the rotation with the rotating shaft of the rocker arm as the center.

Compared with the prior art, the present disclosure has the following beneficial effects.

According to the switch handle component of the riding lawn mower provided by the present disclosure, the locking plate is provided, and the first tension spring is provided on the locking plate. The tension of the first tension spring, the position where the first tension spring is connected to the locking plate, and the structural relationship of the connecting position between the manipulating handle and the locking plate cause the manipulating handle in the switch handle component to automatically keep a certain force value in the ON or OFF state, thereby realizing the automatic locking of the position. Therefore, when the cutter can be controlled to be started and stopped, it is only necessary to pull or push the manipulating handle to move to different positions. Moreover, after the manipulating handle moves to the proper position, because of the above structure, the manipulating handle can be automatically locked to the moved position without locking other locking structures, which is convenient and simple to operate, simple in structure and low in cost.

According to the switch handle component of the riding lawn mower provided by the present disclosure, a limiting block mechanism is provided to be in contact with the touching switch at the OFF position, so that the safety requirement of starting a circuit can be met. The cutter of the riding lawn mower is provided with an on switch, which is not turned on under normal conditions. The cutter can only be started after the engine is ignited.

According to the cutter control system provided by the present disclosure, a tensioning wheel is provided on a mowing tray in a chassis system, the tensioning wheel is mounted on a rotatable rocker arm, a first brake pad is mounted on the rocker arm, and a second brake pad is connected through a connecting rod; when the switch handle component of the cutter of the lawn mower is in the OFF position A1, the rocker arm of the tensioning wheel of the mowing tray is released, and the first brake pad at the upper end is in contact with the first tool holder component to brake; the rocker arm of the tensioning wheel of the mowing tray drives the connecting rod, so that the second brake pad is in contact with the second tool holder component to brake the pulley of the second tool holder component; the blade can brake quickly when the cutter stops; the ingenious feature of the mechanism is that when the switch handle component of the cutter is operated, a plurality of groups of linkage mechanisms perform corresponding functions, such as braking and power transmission cutting off, or releasing and power transmission connecting.

BRIEF DESCRIPTION OF THE DRAWINGS

In order to explain the embodiments of the present disclosure or the technical schemes in the prior art more clearly, the drawings that need to be used in the description of the embodiments or the prior art will be briefly introduced hereinafter. Obviously, the drawings in the following description are only some embodiments of the present disclosure. For those skilled in the art, other drawings can be obtained according to these drawings without any creative effort.

In the figures, 1, manipulating handle; 11, clutch lever; 12, grip handle; 2, locking plate; 3, fixed seat; 4, first tension spring; 5, touching switch; 6, limiting block mechanism; 7, belt tensioning component; 71, drive belt; 72, first tool holder component; 73, second tool holder component; 74, guide wheel; 75, tensioning wheel; 76, rocker arm; 77, connecting rod; 78, first brake pad; 79, second brake pad; 8, cable assembly; 81, pull rod; 82, second tension spring; 100, frame; 200, mowing tray.

DETAILED DESCRIPTION OF THE EMBODIMENTS

In order to make the object, technical scheme and advantages of the present disclosure clearer, the technical scheme of the present disclosure will be described in detail hereinafter. Obviously, the described embodiments are only part of the embodiments of the present disclosure, rather than all of the embodiments. Based on the embodiment of the present disclosure, all other embodiments obtained by those skilled in the art without any creative effort belong to the scope of protection of the present disclosure.

Figure 2:
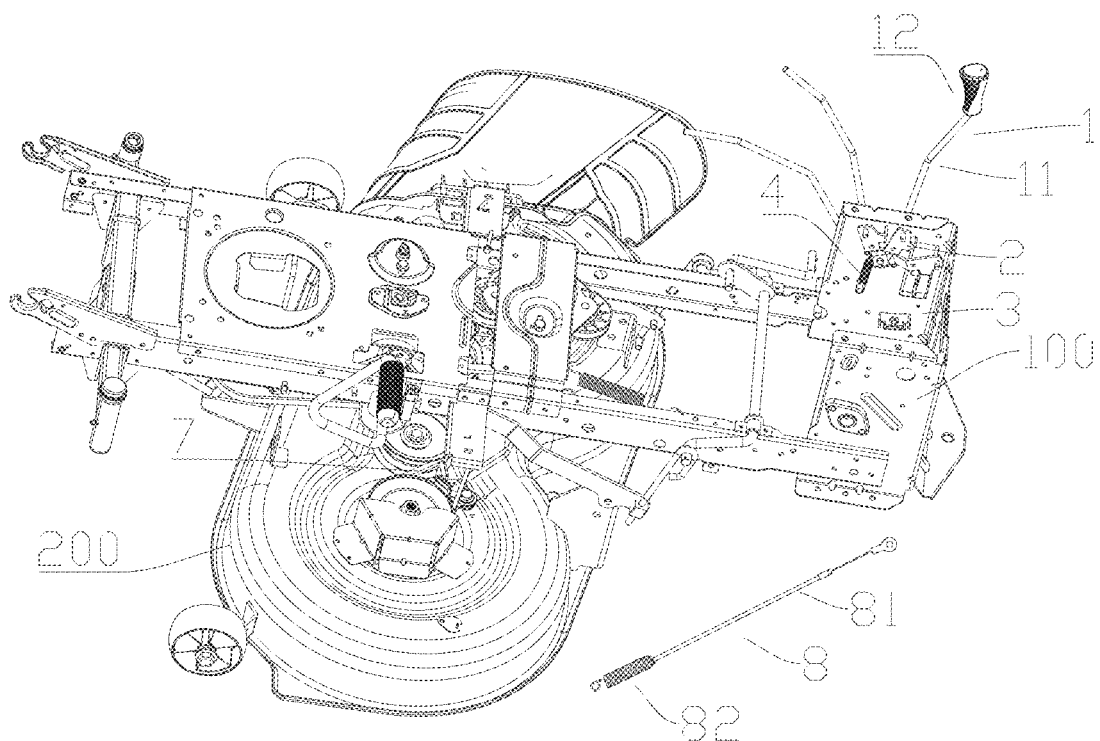
FIG. 2 is a schematic structural diagram of a switch handle component according to the present disclosure.
Figure 4:
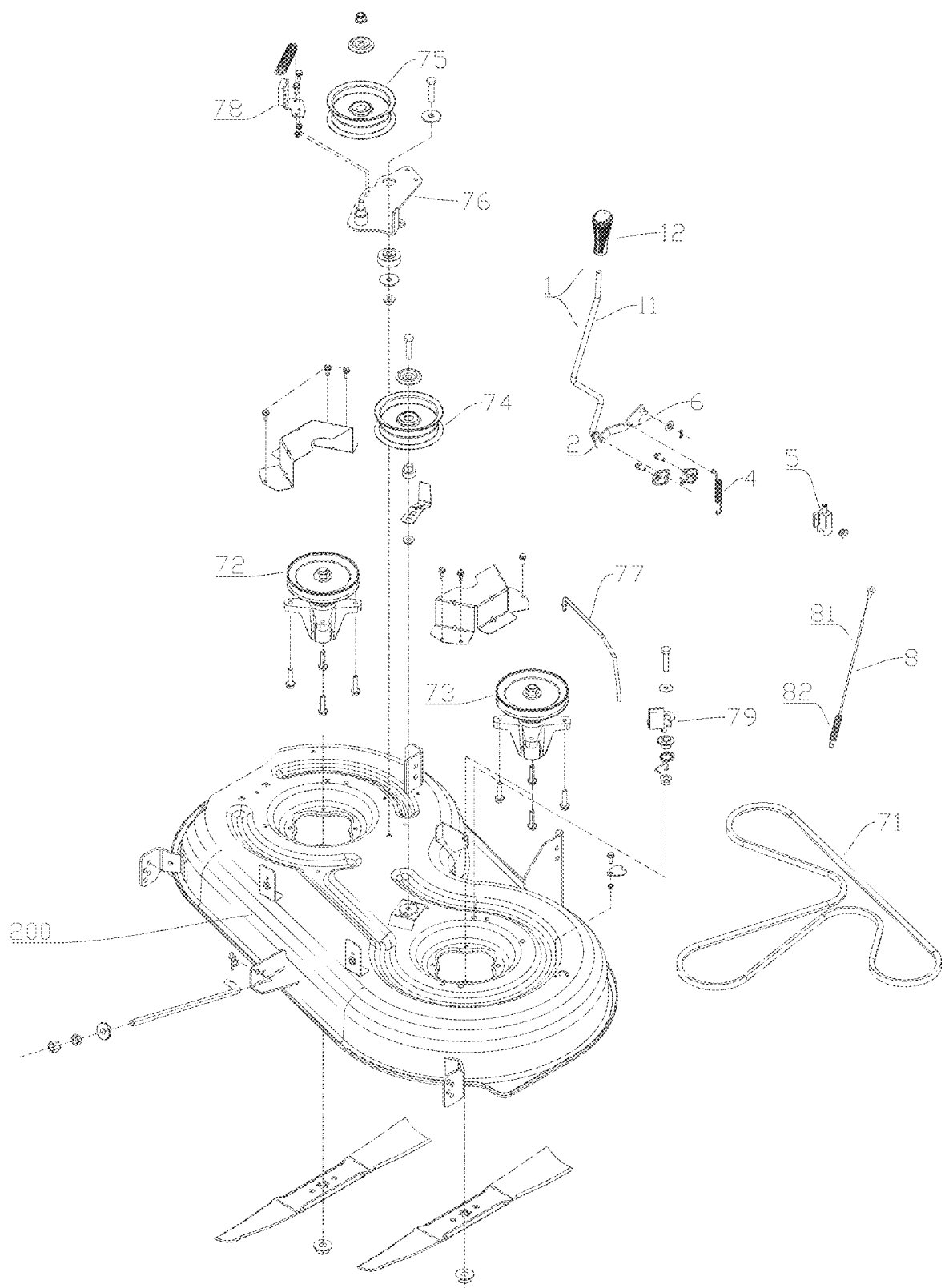
FIG. 4 is an explosion diagram of a cutter control system according to the present disclosure.

As shown in FIGS. 2 and 4, the present disclosure provides a switch handle component, comprising a manipulating handle 1, a locking plate 2, a fixed seat 3 and a first tension spring 4, wherein:

the fixed seat 3 is fixed to a frame 100;

the manipulating handle 1 is fixedly connected to the lower part of the locking plate 2;

the locking plate 2 is rotatably connected to the fixed seat 3;

one end of the first tension spring 4 is fixed to the frame 100 and is provided near a rotating shaft of the locking plate 2, and the other end thereof is fixed to the middle of the locking plate 2;

when the manipulating handle 1 rotates to different positions, the first tension spring 4 applies tension in different directions to the locking plate 2, respectively, so as to realize the automatic locking of the manipulating handle 1 after switching among the OFF position, the dead point position and the ON position.

Figure 3:
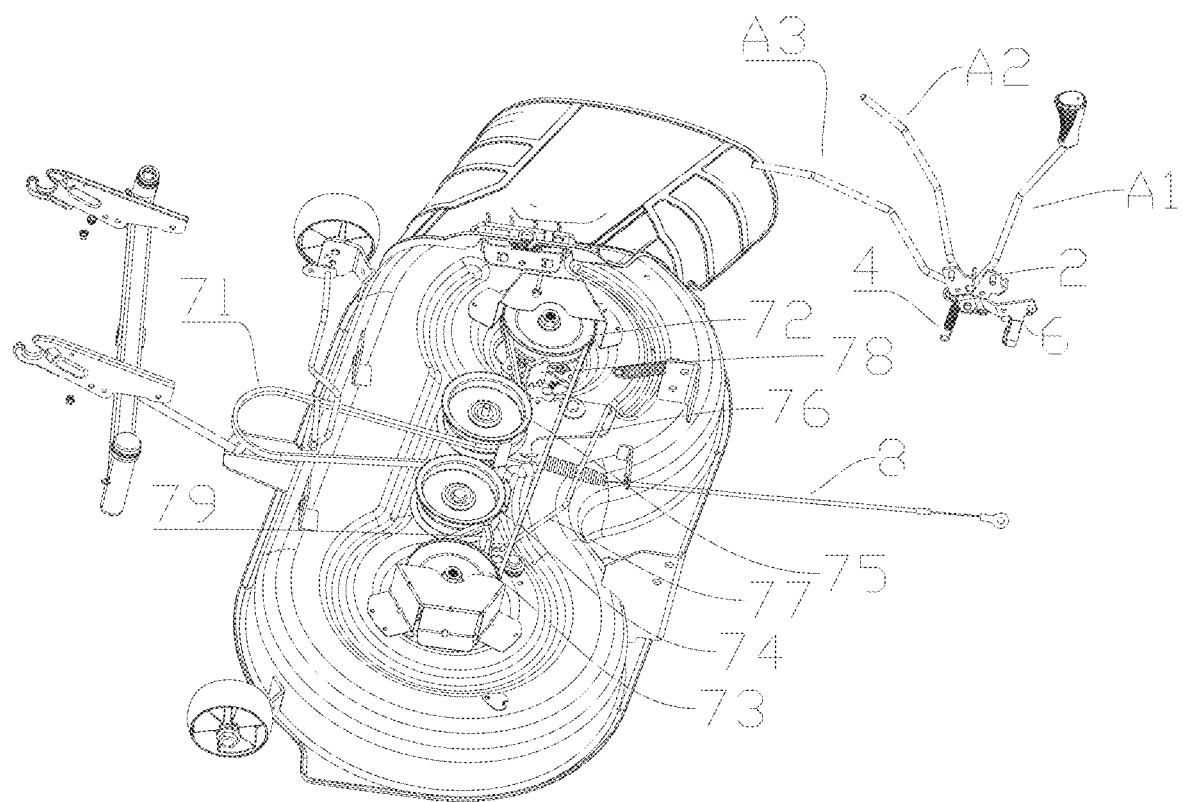
FIG. 3 is a schematic structural diagram of a cutter control system according to the present disclosure.

As shown in FIG. 3, the OFF position is A1, the dead point position is A2, and the ON position is A3.

According to the switch handle component of the riding lawn mower provided by the present disclosure, the locking plate is provided, and the first tension spring is provided on the locking plate. The tension of the first tension spring, the position where the first tension spring is connected to the locking plate, and the structural relationship of the connecting position between the manipulating handle and the locking plate cause the manipulating handle in the switch handle component to automatically keep a certain force value in the ON or OFF state, thereby realizing the automatic locking of the position. Therefore, when the cutter can be controlled to be started and stopped, it is only necessary to pull or push the manipulating handle to move to different positions.

Moreover, after the manipulating handle moves to the proper position, because of the above structure, the manipulating handle can be automatically locked to the moved position without locking other locking structures, which is convenient and simple to operate, simple in structure and low in cost.

Figure 1:
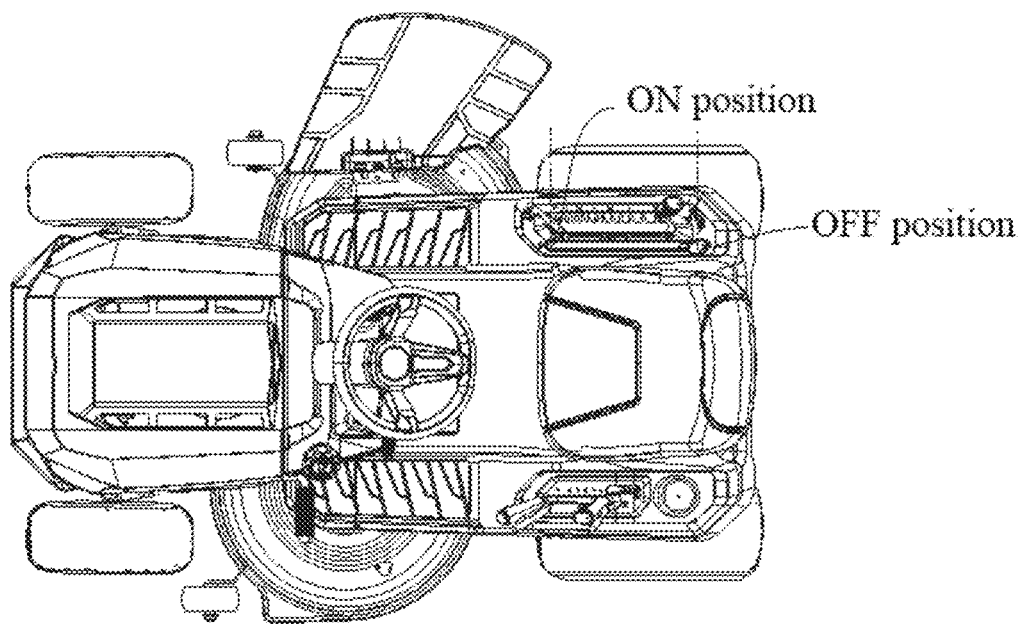
FIG. 1 is a top view of a switch handle component mounted on a lawn mower according to the present disclosure.

As shown in FIG. 1, further, the manipulating handle 1 is provided on the right side of a lawn mower seat.

The manipulating handle is provided on the right side of a seat, which is convenient for right-hand operation and ergonomic.

Further, the switch handle component further comprises a touching switch 5 provided on the frame 100 and a limiting block mechanism 6 provided on the locking plate 2, wherein the limiting block mechanism 6 is in contact with the touching switch 5 when the manipulating handle 1 rotates to the OFF position.

The touching switch 5 and the limiting block mechanism 6 are provided, so that when the manipulating handle 1 is in the OFF position, even if the engine of the lawn mower operates, that is, after the device starts, the mowing tray will not start, thus ensuring safety.

Figure 5:
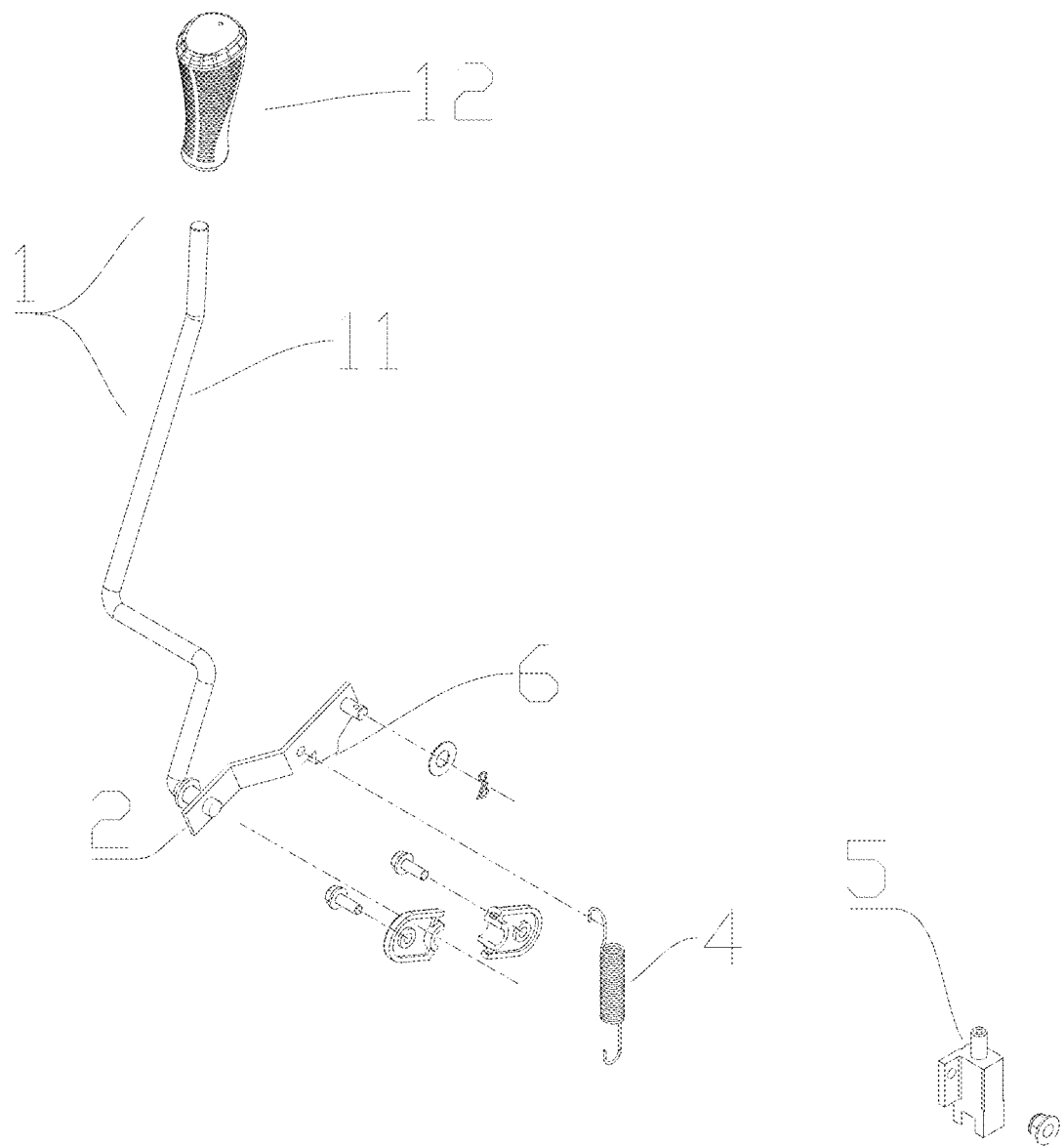
FIG. 5 is an exploded diagram of a switch handle component according to the present disclosure.

As shown in FIG. 4 and FIG. 5, as a further improvement of the present disclosure, the locking plate 2 has an elongated plate structure, the plate surface of the locking plate 2 is Z-shaped, the limiting block mechanism 6 is provided at one side of the tail end of the locking plate 2; and the first tension spring 4 is connected to the side of the limiting block mechanism 6.

The locking plate 2 is provided to be Z-shaped, so that the first tension spring 4 can be avoided when rotating, so as to prevent interference and ensure the smooth swing of the first tension spring 4.

According to the switch handle component of the riding lawn mower provided by the present disclosure, a limiting block mechanism is provided to be in contact with the touching switch at the OFF position, so that the safety requirement of starting a circuit can be met. The cutter of the riding lawn mower is provided with an on switch, which is not turned on under normal conditions. The cutter can only be started after the engine is ignited.

As shown in FIG. 5, specifically, the manipulating handle 1 comprises a clutch lever 11 with a multi-section bending structure and a grip handle 12 provided at the tail end of the clutch lever 11.

During operation, the control of the start and stop of the cutter can be completed by pushing and pulling the grip handle 12, which is convenient to operate and excellent in operation comfort.

As shown in FIGS. 1-5, the present disclosure provides a cutter control system, comprising a belt tensioning component 7, a cable assembly 8, and a switch handle component. One end of the cable assembly 8 is connected with the switch handle component, and the other end thereof is connected with the belt tensioning component 7, so that the belt tensioning component 7 switches between the tensioning state and the releasing state when the manipulating handle 1 rotates to different positions, and the cutter on the mowing tray 200 rotates or stops.

According to the present disclosure, the switch handle component is connected with the cable assembly, so that the belt tensioning component is controlled to be tensioned or released. Therefore, when the switch handle component is in the OFF position, the belt tensioning component is in the releasing state, and the cutter is kept still. When the switch handle component is in the ON position, the belt tensioning component is in the tensioning state, and the cutter is driven to rotate.

Specifically, the cable assembly 8 comprises a pull rod 81 and a second tension spring 82, and the pull rod 81 is rotatably connected with the tail end of the locking plate 2 through a cylindrical pin. One end of the second tension spring 82 is connected with the pull rod 81, and the other end thereof is connected with the belt tensioning component 7.

The second tension spring 82 is provided on the cable assembly 8, which can ensure stable transmission and achieve a certain buffering effect during motion transmission without damaging components due to too fast and too violent operation.

Further, the beginning end of the pull rod 81 is provided with a flexible rope, the beginning end of the flexible rope is provided with a pull ring, and the pull ring is sleeved outside the cylindrical pin.

As shown in FIG. 3 and FIG. 4, as an alternative embodiment of the present disclosure, the belt tensioning component 7 comprises a drive belt 71, a first tool holder component 72, a second tool holder component 73, a guide wheel 74, a tensioning wheel 75, a rocker arm 76, a connecting rod 77, a first brake pad 78 and a second brake pad 79. One end of the drive belt 71 is in transmission connection with the power source of the lawn mower, and the other end thereof is wound around the tensioning wheel 75, the first tool holder component 72, the guide wheel 74 and the second brake pad 73 in sequence. The rocker arm 76 is rotatably provided on the mowing tray 200. The tensioning wheel 75 is rotatably mounted on the rocker arm 76. The first brake pad 78 is mounted on the rocker arm 76. The second brake pad 79 is mounted on the tail end of the connecting rod 77, and the beginning end of the connecting rod 77 is mounted on the rocker arm 76. The second tension spring 82 is connected to the rocker arm 76 and is capable of pulling the rocker arm 76 to rotate. When the rocker arm 76 is in the original position, the first brake pad 78 and the second brake pad 79 are in contact with the pulleys on the first tool holder component 72 and the second tool holder component 73, respectively, so as to realize braking. When the rocker arm 76 is in the original position, the tensioning wheel 75 is lightly attached to or separated from the drive belt 71, and the drive belt 71 is in the releasing state.

According to the cutter control system provided by the present disclosure, a tensioning wheel is provided on a mowing tray in a chassis system, the tensioning wheel is mounted on a rotatable rocker arm, a first brake pad is mounted on the rocker arm, and a second brake pad is connected through a connecting rod; when the switch handle component of the cutter of the lawn mower is in the OFF position A1, the rocker arm of the tensioning wheel of the mowing tray is released, and the first brake pad at the upper end is in contact with the first tool holder component to brake; the rocker arm of the tensioning wheel of the mowing tray drives the connecting rod, so that the second brake pad is in contact with the second tool holder component to brake the pulley of the second tool holder component; the blade can brake quickly when the cutter stops; the ingenious feature of the mechanism is that when the switch handle component of the cutter is operated, a plurality of groups of linkage mechanisms perform corresponding functions, such as braking and power transmission cutting off, or releasing and power transmission connecting.

Specifically, the first brake pad 78 and the second brake pad 79 are located on both sides of the rocker arm 76, respectively. When the rocker arm 76 is pulled to rotate, the first brake pad 78 and the second brake pad 79 follow the rotation with the rotating shaft of the rocker arm 76 as the center.

The control principle of the cutter control system is as follows. The right side of the riding lawn mower is provided with a switch handle component of a cutter. The switch handle component is fixed to the frame 100 as a support point. The switch handle component is connected with the belt tensioning component 7 on the chassis system through the cable assembly 8. The initial OFF position of the switch handle component of the cutter is at A1, A2 is the dead point position in the middle, and A3 is the automatic ON position after the cutter is started. The switch handle component of the cutter is connected with the cable assembly 8 by a cylindrical pin. The second tension spring 82 on the cable assembly 8 is connected with the rocker arm 76 under the tensioning wheel 75 of the mowing tray 200. After the switch handle component is in the ON A3 state, the cable pulls the rocker arm 76 to rotate, driving the tensioning wheel 75 to move and tightly contact with the drive belt 71, so that the drive belt 71 maintains the tensioning state to a certain extent. The drive belt drives the tool holder component to rotate, so that the blade rotates. When the switch handle component of the cutter returns to the A1 position, the cable is released, the tensioning wheel is released, and the blade loses power.

A first brake pad 78 is mounted on the rocker arm 76 at the lower part of the tensioning wheel of the mowing tray 200, and a second brake pad 79 is connected through a connecting rod 77; when the switch handle component of the cutter of the lawn mower is in the position A1, the rocker arm 76 of the tensioning wheel of the mowing tray is released, and the first brake pad at the upper end is in contact with the first tool holder component 72 to brake; the rocker arm of the tensioning wheel of the mowing tray drives the connecting rod 77, so that the second brake pad 79 is in contact with the second tool holder component 73 to brake the pulley of the second tool holder component; the blade can brake quickly when the cutter stops; the ingenious feature of the mechanism is that when the switch handle component of the cutter is operated, a plurality of groups of linkage mechanisms perform corresponding functions.

First of all, it should be noted that "inward" is the direction towards the center of the accommodation space, and "outward" is the direction away from the center of the accommodation space.

In the description of the present disclosure, it should be understood that the orientational or positional relationships indicated by the terms such as "center", "longitudinal", "transverse", "length", "width", "thickness", "up", "down", "front", "back", "left", "right", "vertical", "horizontal", "top", "bottom", "inside", "outside", "clockwise", "counterclockwise", "axial", "radial", "circumferential" are based on the orientational or positional relationships shown in FIG. 1 only for the convenience of describing the present disclosure and simplifying the description, rather than indicate or imply that the referred devices or elements must have a specific orientation, be constructed and operated in a specific orientation, and therefore should not be construed as limiting the present disclosure.

In addition, the terms such as "first" and "second" are only used for the purpose of description, and cannot be understood as indicating or implying relative importance or implicitly indicating the number of indicated technical features. Therefore, the features defined with "first" and "second" can include at least one of these features explicitly or implicitly. In the description of the present disclosure, "a plurality of" means at least two, such as two, three, etc., unless otherwise specifically defined.

In the present disclosure, unless otherwise specified and defined expressly, the terms such as "mount", "link", "connect" and "fix" should be understood broadly, for example, it can be fixed connection, detachable connection or integral connection; or mechanical connection or electrical connection; or direct connection or indirect connection through an intermediate medium, or internal communication in two elements or interaction between two elements, unless otherwise specified. For those skilled in the art, the specific meanings of the above terms in the present disclosure can be understood according to specific situations.

In the present disclosure, unless otherwise specified and defined, the first feature "above" or "below" the second feature may be the direct contact between the first feature and the second feature, or the indirect contact between the first feature and the second feature through an intermediate medium. Further, the first feature is "on", "above" and "over" the second feature, indicating that the first feature is directly above or obliquely above the second feature, or only indicating that the horizontal height of the first feature is higher than that of the second feature. The first feature is "below", "under" and "underneath" the second feature, indicating that the first feature is directly under or obliquely under the second feature, or only indicating that the horizontal height of the first feature is smaller than that of the second feature.

In the description of this specification, the description referring to the terms "one embodiment", "some embodiments", "examples", "specific examples" or "some examples" means that the specific features, structures, materials or characteristics described in connection with this embodiment or example are included in at least one embodiment or example of the present disclosure. In this specification, the schematic expressions of the above terms do not necessarily refer to the same embodiment or example. Further, the specific features, structures, materials or characteristics described may be combined in any one or more embodiments or examples in a suitable manner. In addition, those skilled in the art can incorporate and combine different embodiments or examples and features of different embodiments or examples described in this specification without contradicting each other.

The above only describes the specific embodiments of the present disclosure, but the scope of protection of the present disclosure is not limited thereto. Any changes or substitutions conceivable to those skilled in the art within the technical scope disclosed by the present disclosure should be covered within the scope of protection of the present disclosure. Therefore, the scope of protection of the present disclosure should be based on the scope of protection of the claims.

What is claimed is:

1. A switch handle component, comprising a manipulating handle, a locking plate, a fixed seat, a touching switch and a first tension spring, wherein:
   the fixed seat is fixed to a frame;
   the manipulating handle is fixedly connected to the lower part of the locking plate;
   the locking plate is rotatably connected to the fixed seat;
   one end of the first tension spring is fixed to the frame and is provided near a rotating shaft of the locking plate, and the other end thereof is fixed to the middle of the locking plate;
   when the manipulating handle rotates to different positions, the first tension spring applies tension in different directions to the locking plate, respectively, so as to realize the automatic locking of the manipulating handle after switching among the OFF position, the dead point position and the ON position;

wherein the touching switch is provided on the frame and a limiting block mechanism is provided on the locking plate, and the limiting block mechanism is in contact with the touching switch when the manipulating handle rotates to the OFF position.

2. The switch handle component according to claim 1, wherein the manipulating handle is provided on the right side of a lawn mower seat.

3. The switch handle component according to claim 1, wherein the locking plate has an elongated plate structure, the plate surface of the locking plate is Z-shaped, the limiting block mechanism is provided at one side of the tail end of the locking plate; and the first tension spring is connected to the side of the limiting block mechanism.

4. The switch handle component according to claim 1, wherein the manipulating handle comprises a clutch lever with a multi-section bending structure and a grip handle provided at the tail end of the clutch lever.

5. A cutter control system, comprising a belt tensioning component, a cable assembly and the switch handle component according to claim 1, wherein one end of the cable assembly is connected with the switch handle component, and the other end thereof is connected with the belt tensioning component, so that the belt tensioning component switches between the tensioning state and the releasing state when the manipulating handle rotates to different positions, and the cutter on the mowing tray rotates or stops;

wherein the cable assembly comprises a pull rod and a second tension spring, the pull rod is rotatably connected with the tail end of the locking plate through a cylindrical pin; one end of the second tension spring is connected with the pull rod, and the other end thereof is connected with the belt tensioning component.

6. The cutter control system according to claim 5, wherein the beginning end of the pull rod is provided with a flexible rope, the beginning end of the flexible rope is provided with a pull ring, and the pull ring is sleeved outside the cylindrical pin.

7. The cutter control system according to claim 5, wherein the belt tensioning component comprises a drive belt, a first tool holder component, a second tool holder component, a guide wheel, a tensioning wheel, a rocker arm, a connecting rod, a first brake pad and a second brake pad, one end of the drive belt is in transmission connection with the power source of the lawn mower, and the other end thereof is wound around the tensioning wheel, the first tool holder component, the guide wheel and the second brake pad in sequence; the rocker arm is rotatably provided on the mowing tray, the tensioning wheel is rotatably mounted on the rocker arm, the first brake pad is mounted on the rocker arm, the second brake pad is mounted on the tail end of the connecting rod, and the beginning end of the connecting rod is mounted on the rocker arm; the second tension spring is connected to the rocker arm and is capable of pulling the rocker arm to rotate; when the rocker arm is in the original position, the first brake pad and the second brake pad are in contact with the pulleys on the first tool holder component and the second tool holder component, respectively, so as to realize braking; and when the rocker arm is in the original position, the tensioning wheel is lightly attached to or separated from the drive belt, and the drive belt is in the releasing state.

8. The cutter control system according to claim 7, wherein the first brake pad and the second brake pad are located on both sides of the rocker arm, respectively, and when the rocker arm is pulled to rotate, the first brake pad and the second brake pad follow the rotation with the rotating shaft of the rocker arm as the center.

* * * * *